(12) United States Patent
Hekal

(10) Patent No.: US 7,141,190 B2
(45) Date of Patent: Nov. 28, 2006

(54) BIAXIALLY ORIENTED HOLLOW THERMOPLASTIC BODIES AND IMPROVED METHOD FOR STERILIZATION

(76) Inventor: Ihab M. Hekal, 230 Round Hill Rd., Greenwich, CT (US) 06831

( * ) Notice: Subject to any disclaimer, the term of this patent is extended or adjusted under 35 U.S.C. 154(b) by 57 days.

(21) Appl. No.: 10/432,718

(22) PCT Filed: Nov. 27, 2001

(86) PCT No.: PCT/US01/44095

§ 371 (c)(1),
(2), (4) Date: May 27, 2003

(87) PCT Pub. No.: WO02/42055

PCT Pub. Date: May 30, 2002

(65) Prior Publication Data

US 2004/0113328 A1    Jun. 17, 2004

(51) Int. Cl.
*B29C 49/46* (2006.01)
(52) U.S. Cl. .................. 264/37.25; 264/570; 264/523; 264/85
(58) Field of Classification Search ................ 264/570, 264/523, 37.25, 85
See application file for complete search history.

(56) References Cited

U.S. PATENT DOCUMENTS

| | | | | |
|---|---|---|---|---|
| 4,321,938 | A * | 3/1982 | Siller | 137/99 |
| 4,340,344 | A * | 7/1982 | Aston et al. | 425/149 |
| 4,428,900 | A * | 1/1984 | Riley et al. | 264/526 |
| 4,499,045 | A * | 2/1985 | Obsomer | 264/532 |
| 5,178,841 | A * | 1/1993 | Vokins et al. | 422/298 |
| 6,692,684 | B1 * | 2/2004 | Nantin et al. | 264/521 |
| 2001/0010145 | A1 * | 8/2001 | Tawa et al. | 53/425 |

* cited by examiner

Primary Examiner—Suzanne E. McDowell
(74) Attorney, Agent, or Firm—William H. Holt

(57) ABSTRACT

A process of molding thermoplastic preforms into bottles and similar containers wherein pressurized liquids, such as water, are used in the stretching and shaping process instead of pneumatic gases, such as heated air. The result is greater control over the crystallization of the thermoplastic material and economies of scale. Addition of peroxides, or similar materials are used for sterilization can be added to the liquid thereby conditioning the container for immediate filling with sterile product and eliminating the need for an additional sterilization step following completion of the molding step. As an added step, dry, sterile air can be used to vent and dry the container just prior to introduction of product. Also use of liquid, rather than heated air, provides a washing or cleansing of actealdehydes or ethanol, which may be present in the extruded preform, from the finished container.

14 Claims, No Drawings

BIAXIALLY ORIENTED HOLLOW THERMOPLASTIC BODIES AND IMPROVED METHOD FOR STERILIZATION

BACKGROUND OF THE INVENTION

Plastic forming of hollow bodies has heretofore encompassed a wide variety of processes and techniques including but not limited to blow molding, stretch-blow molding, thermoforming and the like. For example, hollow bodies having threaded necks are produced from injection-molded preforms which are heated and then expanded by high pressure air through a process called blow molding. At times the preform is allowed to cool down prior to arrival at the blow molding station from the injection molding station and then it must be thermally conditioned within a relatively narrow tolerance to a temperature that is suitable for a subsequent stretching process. In order to obtain uniform and good orientation, the temperature variation across the wall of the body should be within 10 degrees Celsius and not much above 10 degrees Celsius from the glass transition temperature of the plastic to be stretch-blown during the forming process. The closer the temperature is to the glass transition temperature, the more orientation is obtained. However, much higher pressure is required to stretch and blow the container at the lower temperature; therefor, a compromise has to be made. The oriented hollow bodies thus obtained exhibit a mechanical strength which is markedly improved to the point that the bodies can generally be used for packaging carbonated beverages under pressure. The air pressure used in this known process for stretch-blow molding can exceed 1,000 pounds per square inch (psi) if a particular bottom design is required for such containers. Other features, such as molded-in impressions, horizontal rings to resist buckling of the container, and vertical lines to improve stackability all require even higher air pressure during the forming process.

Heat-setting of polyethylene terephthalate (PET) bottles, or other shapes of containers, by stretch-blowing the preforms in a high temperature mold is presently used to crystallize the PET. This process is complicated and requires long cycle times. The container is first heated and then cooled by the mold. Therefore, the larger the change in temperature, in order to speed the crystallization, the more energy is consumed during the process, and compromises must be made between the energy use and the speed of the process.

Also, it is known in the prior art that the containers, such as plastic bottles used for beverages, and containers for food products and the like for human or animal consumption, need to be sterilized to avoid contamination of the food, beverages and the like. Heretofore, this sterilization process required an additional process step following completion of the container forming and following the step of exhausting the pressurized air used during the blow molding process.

Another shortcoming of the prior art is that during the extrusion of the plastic material and the shaping of the preform, formation of actealdehydes, or ethanol, occurs. These products are toxic in nature and can remain in the container body following the use of pressurized air during the blow molding process.

SUMMARY OF THE INVENTION

The present invention utilizes liquids instead of air or other gases for the forming process. Liquids are not compressible in a molding environment; therefore; liquids require less energy to transfer a load, and at the same time liquids are excellent heat transfer media. Because the invention is particularly useful for forming containers to be used in the food and beverage field, the present invention is particularly adaptable to the use of water as the hydraulic media. Water is an excellent hydraulic and heat transfer media, economic, readily available, non-toxic, non-hazardous, and subject to easy handling.

Another advantage of using liquids is the avoidance of introducing oxygen into the body of plastic material such as occurs in the prior art in which air is used as the pressure medium. Oxygen has a deleterious effect on many products by reducing shelf-life and causing deterioration of quality. Use of water or other liquids as the pressure medium avoids or minimizes this problem.

The present invention is useful for forming hollow bodies in the form of containers, or bottles, for liquids such as beverages and the like, and also useful for containing solid products such as granular materials, powders, and materials such as pastes, waxes, depending upon the size and shape of the container and the container opening used to fill and empty product to and from the container.

The present invention relies upon the use of hydraulic media, such as water, rather than upon pneumatic media such as air that has been used in the past. The work required to create 1,000 psi air pressure is one order of magnitude higher than the work required to create 1,000 psi hydraulic pressure. The equipment to perform the work is proportionate in cost. Both the capital equipment cost and the energy cost constitute a significant portion of the total cost of producing the bottle or other form of container. Because the cost to create high pressure by hydraulic means is not expensive, then it is feasible to stretch thermoplastic preforms at lower temperatures that are closer to the glass-transition of the material. This improved process results in better molecular orientation and improved properties leading to the production of lighter weight containers using less material.

In accordance with the present invention, sterilization of the containers does not require a separate process step, as is required by the prior art. The hot liquid used for forming the container aids somewhat in sterilization while the container is being formed. Sterilization can be assured by introducing sterilization products into the hot water, or other liquid so that the container is sterile upon completion of the stretch molding step ready to receive product upon being emptied of the liquid used during the forming step. Dry sterile air may be used to vent and dry the container, if needed, following the forming step.

A further feature of the present invention is that by the use of liquid during the expansion of the preform into the desired container shape, the liquid has a washing or cleansing effect to remove some or all of the actealdehydes or ethanol that was formed during the process of extruding the preform.

DESCRIPTION OF THE PREFERRED EMBODIMENTS

The invention is particularly adaptable to the production of polyethylene terephthalate (PET) containers, such as bottles and the like. The novel process can be adapted to the present manufacturing process with minor but important changes. Instead of using hot, pressurized air to blow the preform, tempered water, at approximately 85 degrees Celsius, is pumped into the preform and then pressurized. When the water pressure reaches the desired value and the preform has expanded or stretched to form the desired container shape, the hot water is vented and cooler water is pumped into the bottle, or other form of container, to replace the hot water that can then be stored and used for the next cycle. It is contemplated that the water, or other liquid used during the forming or expansion process can be supplemented by products utilized for sterilization. It is presently preferred that the forming liquid be laced with, for example, peroxide(s) or acetic acid, or other products that are approved by the Food and Drug Administration (FDA). Following the forming step, the bottle or other container then may, but not necessarily, be inverted and sterile, dry air is blown into the bottle to efficiently empty any remaining water, thus leaving the container in a sterile condition and ready for immediate filling with product without requiring the additional sterilization process heretofore needed by the prior art of blow molding with pressurized air. Thus, the containers formed with the present invention can be immediately filled with sterile products, or food or beverages for human consumption.

In those instances in which heat setting is required to make the containers suitable for heat processing of product contained therein, the mold should have the capability to be heated close to the melting point of the thermoplastic material. This could be accomplished, for example, by rf-heating or induction heating. It would be unnecessary to have a cooling arrangement because the required cooling would be achieved by the internal liquid which, as pointed out above, may be at approximately 85 degrees Celsius and, therefor, below the melting point of the plastic used to form the container.

The foregoing is a description of the presently preferred embodiment of the invention but it is to be understood that variations may be made within the scope of the invention as defined in the appended claimed subject matter.

The invention claimed is:

1. A process of forming a container from thermoplastic material including the steps of supplying a preform for said container, placing said preform within a cavity of a mold, and expanding said preform for forming said container, characterized by the step of introducing liquid under pressure into said preform located within said mold for stretching said preform to assume the shape of the surrounding mold cavity, including a step of heating said mold to approximately the melting point of the thermoplastic material.

2. A process as defined in claim 1 wherein heat is transferred from the mold, through the thermoplastic material into cooler liquid introduced within the container.

3. A process as defined in claim 2 wherein the crystallization of the thermoplastlc material can be increased or decreased under controlled conditions.

4. A process as defined in claim 3 including a step of introducing a sterilization product into said liquid.

5. A process as defined in claim 2 including a step of preheating the liquid to approximately 85 degrees C., prior to introducing said liquid into said preform.

6. A process as defined in claim 1 including a step of introducing dry, sterilized air into said container for venting and drying said container.

7. A process or forming a container from thermoplastic material including the steps of supplying a preform for said container, placing said preform within a cavity of a mold, and expanding said preform for forming said container, characterized by the step of introducing liquid under pressure into said preform located within said mold for stretching said preform to assume the shape of the surrounding mold cavity, including a step of introducing a sterilization product into said liquid.

8. A process as defined in claim 7 wherein said sterilization product is a peroxide.

9. A process as defined in claim 7 including the step of filling said container with product upon completion of forming said container.

10. A process as defined in claim 7 including a step of introducing dry, sterilized air into said container for venting and drying said container.

11. A process of forming a container from thermoplastic material including the steps of supplying a preform for said container, placing said preform within a cavity of a mold, and expanding said preform for forming said container, characterized by the step of introducing liquid under pressure into said preform located within said mold for stretching said preform to assume the shape of the surrounding mold cavity, including a step of heating said thermoplastic material to a temperature close to its melting point, and introducing treated liquid into said preform.

12. A process as defined in claim 11 including a step of treating said liquid by including a peroxide.

13. A process as defined in claim 12 including a step of mixing said peroxide with water for forming said liquid.

14. A process as defined in claim 11 wherein said liquid cleanses said preform of actealdehydes and ethanol.

* * * * *